(12) United States Patent
Bishop

(10) Patent No.: US 7,316,094 B1
(45) Date of Patent: Jan. 8, 2008

(54) FISHING APPARATUS WITH HOOKING MECHANISM

(76) Inventor: Kevin Charles Bishop, 274 Widgedon Landing, Hilton, NY (US) 14468

( * ) Notice: Subject to any disclaimer, the term of this patent is extended or adjusted under 35 U.S.C. 154(b) by 0 days.

(21) Appl. No.: 11/528,413

(22) Filed: Sep. 27, 2006

(51) Int. Cl.
*A01K 97/11* (2006.01)
*A01K 97/02* (2006.01)

(52) U.S. Cl. .......................................................... 43/15
(58) Field of Classification Search ............... 43/15–17
See application file for complete search history.

(56) References Cited

U.S. PATENT DOCUMENTS

| | | | | |
|---|---|---|---|---|
| 422,331 A * | 2/1890 | Bradford | ......................... | 43/15 |
| 479,219 A * | 7/1892 | Lane | ............................. | 43/17 |
| 885,627 A * | 4/1908 | Loehr | ............................. | 43/17 |
| 975,822 A * | 11/1910 | Becker et al. | ................ | 43/16 |
| 1,488,838 A * | 4/1924 | Savoie | ........................... | 43/15 |
| 1,549,405 A * | 8/1925 | Bjurstrom | ...................... | 43/15 |
| 1,558,916 A * | 10/1925 | Pennell | .......................... | 43/15 |
| 1,996,704 A * | 4/1935 | Hawkinson | ..................... | 43/16 |
| 2,008,482 A * | 7/1935 | Wolf | ............................... | 43/15 |
| 2,170,000 A * | 8/1939 | Eggleston | ...................... | 43/17 |
| 2,295,250 A * | 9/1942 | Zenewich | ...................... | 43/15 |
| 2,523,592 A * | 9/1950 | Powell et al. | .................. | 43/15 |
| 2,624,972 A * | 1/1953 | Burg | ............................... | 43/17 |
| 2,628,443 A * | 2/1953 | Weckerling | .................... | 43/15 |
| 2,650,052 A * | 8/1953 | Bintz | ........................... | 43/21.2 |
| 2,653,405 A * | 9/1953 | Monahan | ....................... | 43/16 |
| 2,714,270 A * | 8/1955 | Premo | ........................... | 43/15 |
| 2,732,649 A * | 1/1956 | Tuttle | ............................ | 43/17 |
| 2,773,326 A * | 12/1956 | Calvert | .......................... | 43/16 |
| 2,803,912 A * | 8/1957 | Kellar | ........................... | 43/16 |
| 3,017,715 A * | 1/1962 | Kennedy | ....................... | 43/16 |
| 3,187,456 A * | 6/1965 | Apitz | ............................. | 43/17 |
| 3,271,891 A * | 9/1966 | Hancock | ........................ | 43/15 |
| 3,571,963 A * | 3/1971 | Ledbetter | ....................... | 43/16 |
| 3,660,921 A * | 5/1972 | McDonnell | .................... | 43/15 |
| 3,777,389 A * | 12/1973 | DeMino | ......................... | 43/15 |
| 3,807,078 A * | 4/1974 | Bartys | ........................... | 43/17 |
| 3,824,730 A * | 7/1974 | Johnson | ......................... | 43/17 |
| 3,881,269 A * | 5/1975 | Timmons | ....................... | 43/15 |

(Continued)

FOREIGN PATENT DOCUMENTS

CA     2163713 A * 5/1997

*Primary Examiner*—Darren W. Ark
(74) *Attorney, Agent, or Firm*—William M. Hall; Thomas R. FitzGerald, Esq.; Hiscock & Barclay, LLP

(57) ABSTRACT

The invention provides a fishing apparatus having a pivot arm mounted on a frame with a fishing line paid out on one end of the pivot arm via a flexible fishing rod and a hooking mechanism connected to the opposite end via a trigger line and a pull line. The hooking mechanism may resemble a mouse trap with a trigger connected to the trigger line arm a retaining arm engaging the trigger and retaining a spring-loaded arm in the set position. The spring-loaded arm is connected to the pull line. A fish trying to swim with the hook will cause the pivot arm to tip down, triggering the hooking mechanism. The spring-loaded arm pivots downward rapidly, pulling the pivot arm so that the fishing rod moves upward rapidly and sets the hook in the fish's mouth. The spring bias in the spring-loaded arm then keeps the fishing line under tension so that the fish doesn't release the hook without ripping the hook from the mouth.

14 Claims, 5 Drawing Sheets

U.S. PATENT DOCUMENTS

| | | | |
|---|---|---|---|
| 4,016,670 A * | 4/1977 | Pihlaja et al. | 43/17 |
| 4,043,070 A * | 8/1977 | Lamothe | 43/17 |
| 4,083,139 A * | 4/1978 | Schwend | 43/16 |
| 4,161,839 A * | 7/1979 | Ward | 43/17 |
| 4,217,719 A * | 8/1980 | McDonnell | 43/15 |
| 4,321,767 A * | 3/1982 | Hodshire | 43/15 |
| 4,373,287 A * | 2/1983 | Grahl | 43/17 |
| 4,463,511 A * | 8/1984 | Copfer | 43/21.2 |
| 4,486,968 A * | 12/1984 | Gould | 43/15 |
| 4,492,053 A * | 1/1985 | Poulin | 43/15 |
| 4,586,283 A * | 5/1986 | Vocal | 43/15 |
| 4,620,387 A * | 11/1986 | Bloom | 43/15 |
| 4,730,408 A * | 3/1988 | Miller | 43/15 |
| 4,794,718 A * | 1/1989 | Tillman | 43/16 |
| 4,805,336 A * | 2/1989 | Heyerman | 43/17 |
| 4,837,965 A * | 6/1989 | True | 43/17 |
| 4,862,627 A * | 9/1989 | Keller | 43/17 |
| 4,908,973 A * | 3/1990 | Perks | 43/15 |
| 4,912,870 A * | 4/1990 | Smoluk | 43/15 |
| 4,941,278 A * | 7/1990 | Verkuil | 43/15 |
| 4,993,181 A * | 2/1991 | Cooper | 43/15 |
| 5,050,332 A * | 9/1991 | Cross | 43/15 |
| 5,050,333 A * | 9/1991 | Debreczeni | 43/15 |
| 5,157,855 A * | 10/1992 | Schmidt et al. | 43/17 |
| 5,228,227 A * | 7/1993 | Hodgson, Sr. | 43/15 |
| 5,231,784 A * | 8/1993 | Condusta | 43/17 |
| 5,249,387 A * | 10/1993 | Slocum et al. | 43/16 |
| 5,345,708 A * | 9/1994 | Loyd | 43/15 |
| 5,408,779 A * | 4/1995 | Parker | 43/15 |
| 5,524,376 A * | 6/1996 | Flisak | 43/15 |
| 5,564,213 A * | 10/1996 | Rinehart | 43/17 |
| 5,890,312 A * | 4/1999 | Ball | 43/16 |
| 5,987,801 A * | 11/1999 | Anderson | 43/17 |
| 5,992,080 A * | 11/1999 | Allen | 43/15 |
| 6,079,142 A * | 6/2000 | Danser et al. | 43/17 |
| 6,088,946 A * | 7/2000 | Simmons | 43/15 |
| 6,094,851 A * | 8/2000 | Guidry | 43/15 |
| 6,354,036 B1 * | 3/2002 | Carlson et al. | 43/17 |
| 6,594,941 B1 * | 7/2003 | Anderson | 43/17 |
| 6,772,551 B1 * | 8/2004 | Bielinski et al. | 43/15 |

* cited by examiner

FISHING APPARATUS WITH HOOKING MECHANISM

FIELD OF THE INVENTION

This invention relates fishing apparatus, especially those with an automatic hooking mechanism.

BACKGROUND OF THE INVENTION

When fishing, and especially when ice fishing, people want to maximize the amount of fish they catch by using several fishing lines. It can be difficult, however, to know when a fish is on the line while monitoring several lines. One solution to this problem is to attach a tip up apparatus to each line. The tip up raises a flag when a fish pulls on the hook line. The user must run over to the line and manually hook the fish when the tip up indicates that a fish is pulling on the line. The user is often too late to hook the fish, however, and the fish escapes. Certain fishing apparatus attempt to automatically hook the fish so the user only needs to reel the fish in. Conventional fishing apparatus have several deficiencies as described below.

There exists a number of U.S. patents directed to fishing apparatus including U.S. Pat. No. 5,890,312 issued to Ball. Ball teaches a fishing apparatus for setting a fish hook into a fish striking the hook. The apparatus includes a fishing pole that pivotally engages a pair of brackets at one end and supports a hook line at the other end. The hook setting apparatus has a mousetrap construction and the hook line loops under a trigger rod that is linked to the mousetrap trigger. The mousetrap trigger engages a keeper that holds a U-shaped band in the ready position. The U-shaped band is biased away from the hook end of the apparatus by a torsion spring. When a fish strikes the hook, the tension in the hook line pulls on the trigger rod, which actuates the mousetrap trigger. This releases the U-shaped band, which rotates away from the hook end of the apparatus according to the spring bias. As the band rotates under the fishing rod, it contacts the rod and forces it momentarily upward. This action tugs on the hook and sets it in the mouth of the fish. Ball teaches that the apparatus allows the hook line to pay out after hooking the fish. Thus the fish could potentially allow slack to accumulate in the hook line, which may allow the fish to release itself from the hook.

U.S. Pat. No. 3,017,715 issued to Kennedy teaches an apparatus with a horizontal base and a mousetrap-type hooking mechanism. The hooking mechanism includes a torsion spring and a wire frame, which is biased away from the hook end of the base. A pull line is attached to the end of the wire frame and the fish hook. A latch pivots about a bail in the base and includes a hook for engaging the wire frame. The opposite side of the latch is attached to a trigger line, which is also attached to the fish hook. In the set position, the wire frame is maintained in a horizontal position against the base by the latch. When a fish tugs the hook, the latch releases the wire frame, which is snapped against a plate by the torsion spring. The snapping action jerks the hook and sets it in the fishes mouth.

U.S. Pat. No. 1,996,704 issued to Hawkinson teaches an apparatus with a horizontal base and a mousetrap-type hooking mechanism. The hooking mechanism includes a torsion spring that biases a wire frame away from the hook end of the base. A trigger mechanism holds the wire frame in the set position. A hook line engages the trigger and is tied to the wire frame. When a fish tugs the line, the hook line bends the trigger and releases the wire frame, which, in turn, sets the hook in the fish's mouth.

U.S. Pat. No. 4,083,139 issued to Schwend teaches an apparatus with a horizontal base, a pivot arm that pivots about one end and pays out the hook line at the opposite end, and a hook setting mechanism. The hook setting mechanism includes a spring that biases the pivot arm toward vertical position and a mousetrap that acts as the trigger. The biasing spring is separate so that the spring's anchor position may be adjusted to increase or decrease the spring force. When a fish strikes the hook, the mousetrap is triggered releasing the pivot arm and allowing the biasing spring to pull the pivot arm upward and set the hook in the mouth of the fish.

In the references, the hook line is connected directly to the trigger, which may interfere with the normal operation of the hook line. Further, the horizontal orientation of the hooking mechanisms in the references takes up a significant portion of the support surface. Even further, the devices do not allow slack in the trigger line to allow the fish to swim with the hook prior to setting the hook. Thus, the hooking mechanism may trip before the fish has the hook completely in its mouth and the hook may be yanked away from the fish rather than being set in the mouth.

Therefore, a fishing apparatus that doesn't connect the hook line to the trigger, that takes up less of the support surface, and that allows the fish to swim with the hook before tripping the hooking mechanism is desired.

SUMMARY OF THE INVENTION

The invention comprises, in one form thereof, an ice fishing apparatus comprising a frame, a pivot arm, a flexible rod, and a spring-loaded hooking mechanism. The frame has a hollow base that allows the user to pack snow under and around the frame for support. The pivot arm pivots about a fulcrum that is supported by the frame. The flexible rod extends from one end of the pivot arm and supports the fishing line. The hooking mechanism includes a spring-loaded lever retained by a trigger. For example, the hooking mechanism may be a mouse trap. The hooking mechanism is affixed to the frame and includes a trigger line and a pull line, both attached to the end of the pivot arm opposite to the flexible rod. The trigger line has a length such that the pivot arm may tip downward and give a fish some room to swim with the bait and hook in its mouth before tripping the trigger. The pull line is attached to the spring-loaded lever of the hooking mechanism such that, when the trigger line trips the trigger, the lever and pull line rapidly pull the end of the pivot arm downward thus jerking the flexible rod upward. This motion hooks the fish. The spring bias on the lever maintains a tension on the fishing line that prevents the fish from escaping from the hook. The spring bias also gives slightly to the pull on the fishing line by the fish to prevent the fishing line from breaking and to prevent the hook from being torn away from the fish.

In one form, the invention includes a fishing apparatus having a frame; a pivot arm having a fulcrum that is supported by the frame, a fishing rod end, and an action end, the fulcrum being between the action end and the fishing rod end; and a hooking mechanism affixed to the frame, the hooking mechanism having a spring-loaded lever arm connected to the action end via a pull line and a trigger and a trigger connected to the action end via a trigger line.

In another form, the invention includes a method of fishing with a fishing apparatus. The method comprises the steps of providing a frame having a hollow base; packing a material under the frame for stabilizing the frame; providing a pivot arm having a fulcrum that is supported by the frame and paying out a hook line from an end of the pivot arm; and setting a hooking mechanism having a spring loaded lever and a trigger affixed to the frame, the lever being connected to the pivot arm via a pull line and the trigger being connected to the pivot arm via a trigger line.

An advantage of the present invention is that the hook line, or fishing line, is not connected directly to the trigger so that the fishing line may operate without interference. Further, the vertical orientation of the hooking mechanism in the present invention allows the apparatus to be compact and the design of the frame allows the apparatus to be stabilized by packing ice, snow, or other materials under the frame. Even further, the present invention allows the pivot arm to tip down before triggering the hooking mechanism allowing the fish to swim with the hook a short distance. This increases the chances of successfully setting the hook in the fish's mouth.

BRIEF DESCRIPTION OF THE DRAWINGS

The present invention is disclosed with reference to the accompanying drawings, wherein.

Corresponding reference characters indicate corresponding parts throughout the several views. The example set out herein illustrates one embodiment of the invention but should not be construed as limiting the scope of the invention in any manner.

DETAILED DESCRIPTION

Figure 1A:
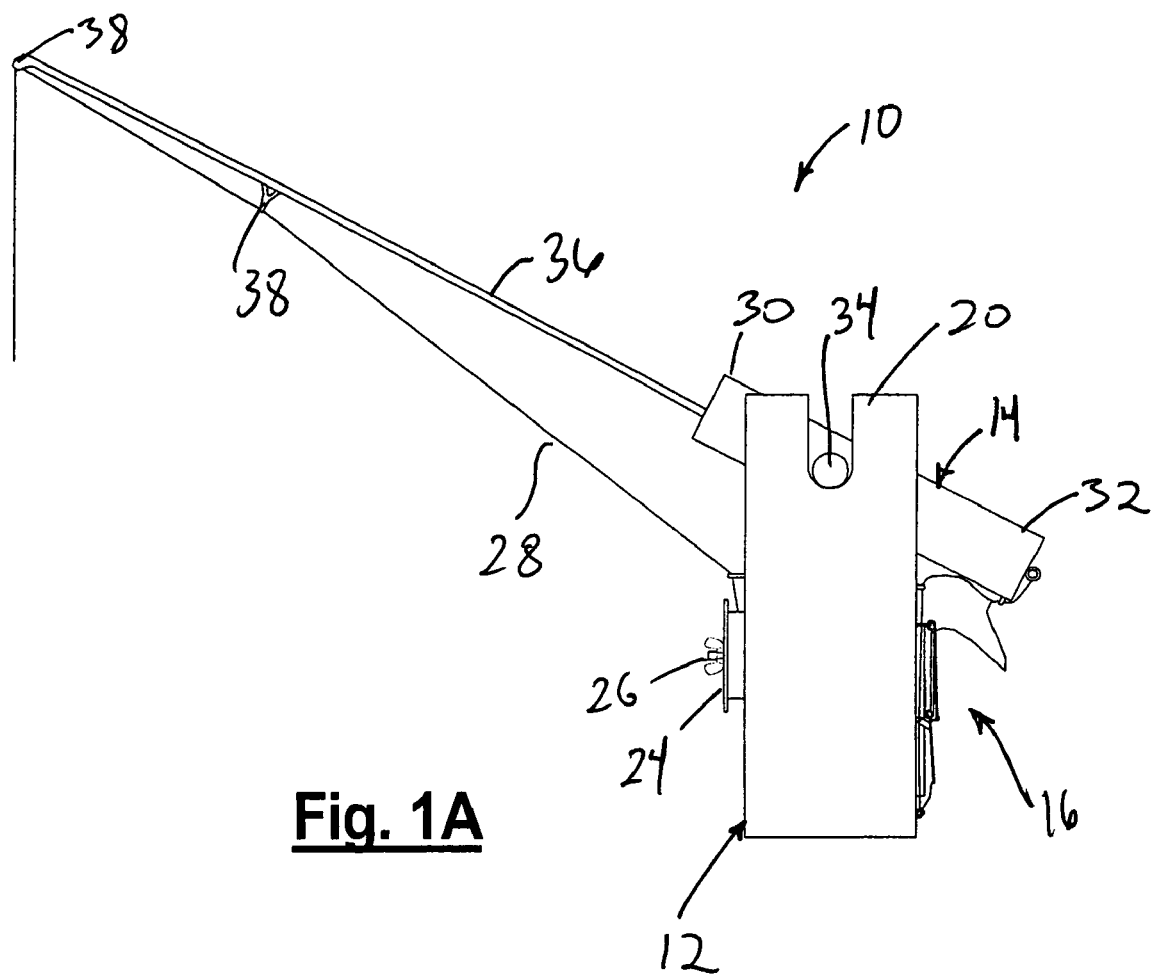
FIG. 1A is a side view of the fishing apparatus of the present invention.

Referring to FIG. 1A, there is shown the fishing apparatus of the present invention. The apparatus 10 includes a frame 12, a pivot arm 14, and a hooking mechanism 16.

Figure 2:
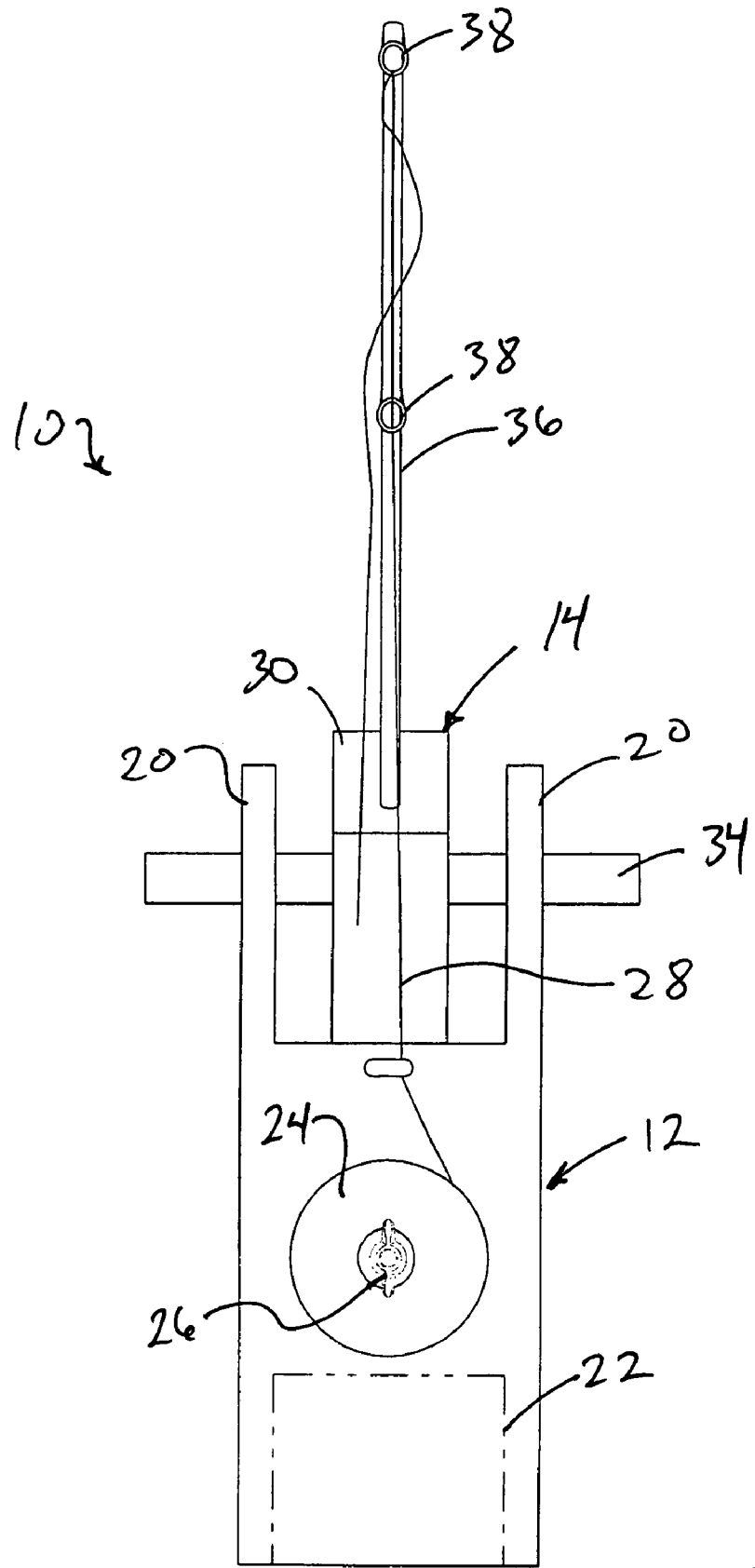
FIG. 2 is a front view of the fishing apparatus of FIG. 1.

The frame 12 is made of a substantially rigid material such as wood, plastic, or metal and is a box-type frame in the illustrated embodiment shown in FIGS. 1A and 2. Two arms 20 extend upward from the frame 12 to support the pivot arm 14 and a hollow portion 22 included at the base of the frame 12 is shown by the phantom lines in FIG. 2. The frame 12 also supports a fishing line spool 24 with a fastener 26, such as a wing nut and bolt, for securing the spool 24 to the frame 12. The wing nut may be loosened to allow the spool 24 to rotate and pay out fishing line 28 as needed.

The pivot arm 14 is made of a substantially rigid material such as wood, plastic, or metal and includes a fishing rod end 30 and an action end 32. The pivot arm 14 is supported by the arms 20 via a fulcrum 34 such that the pivot arm 14 may pivot about the fulcrum 34. A flexible rod 36 extends from the fishing rod end 30 of the pivot arm 14 and carries the fishing line 28 with guides 38.

Figure 1B:
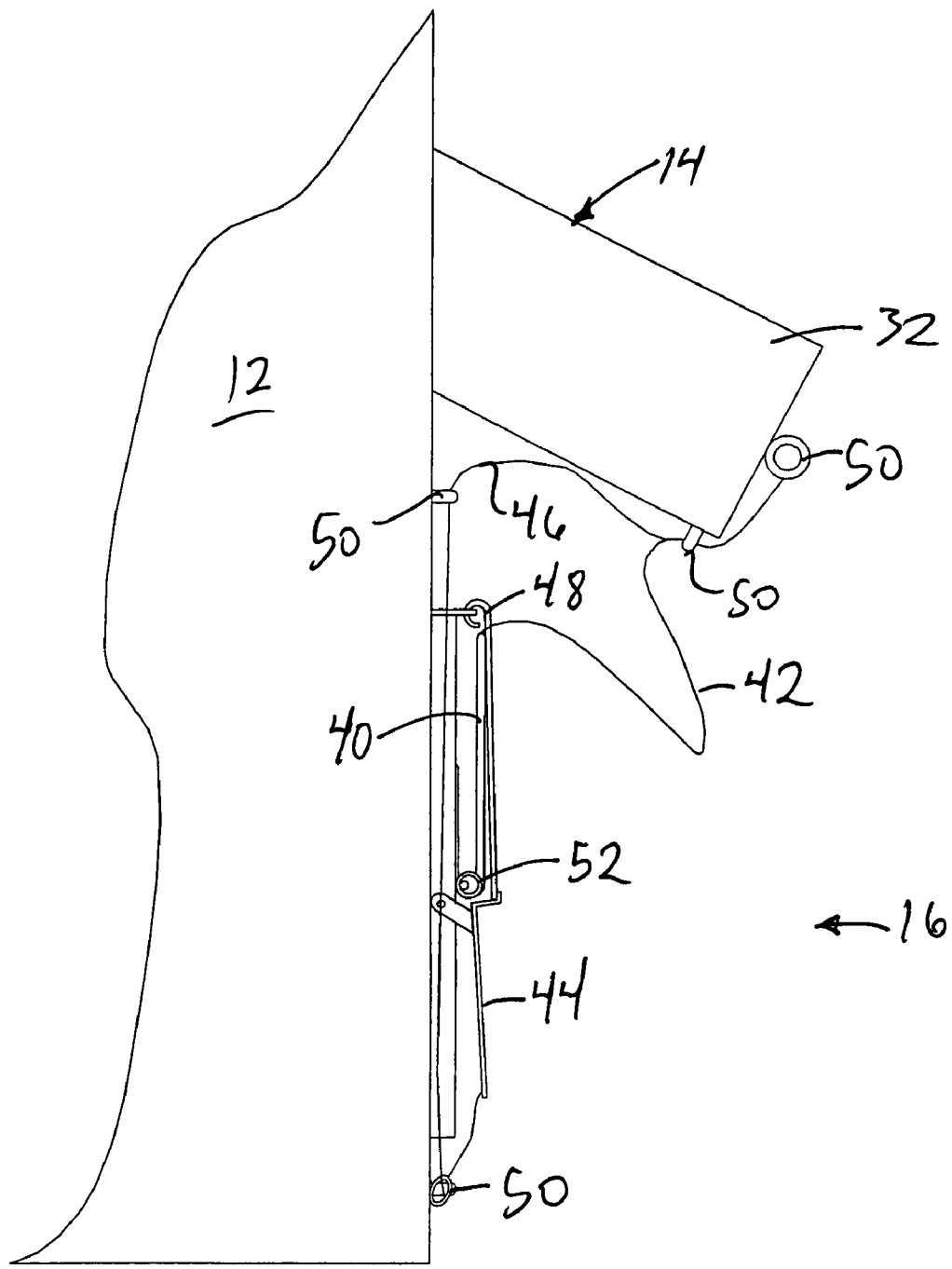
FIG. 1B is a detail view of a portion of the fishing apparatus of FIG. 1A.
Figure 3:
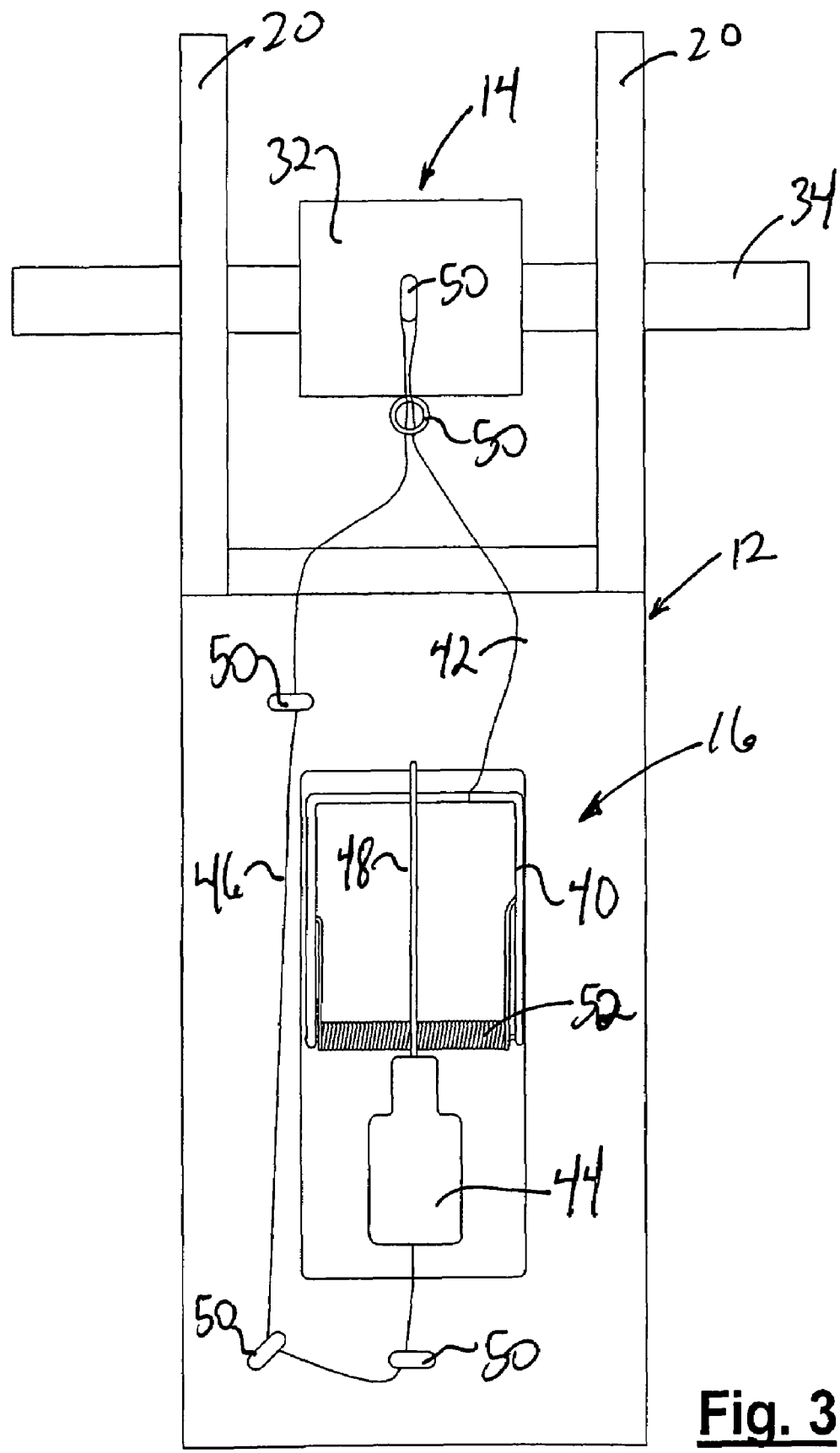
FIG. 3 is a rear view of the fishing apparatus of FIG. 1.

The hooking mechanism 16 is best shown in FIGS. 1B and 3 and, in the illustrated embodiment, it is fashioned similar to a mouse trap. The hooking mechanism 16 includes a spring-loaded arm 40, a pull line 42, a trigger 44, a trigger line 46, and a retaining arm 48. The spring-loaded arm 40 and the trigger 44 are respectfully connected to the action end 32 of the pivot arm 14 by the pull line 42 and the trigger line 46. The pull line 42 and the trigger line are fed through guides 50, such as eyebolts. The spring-loaded arm 40 is biased toward the downward position by a torsion spring 52 and pivots about the axis of the torsion spring 52. When the hooking mechanism 16 is set, as it is in FIGS. 1B and 3, the retaining arm 48 holds the spring-loaded arm 40 in the upright position against its spring bias while the trigger 44 holds the retaining arm 48 in position. The trigger line 46 is long enough to allow the pivot arm 14 to tip down before tripping the trigger 44.

In use, the fishing apparatus 10 may be used in ice fishing or for fishing off a dock or a shore; however, for the purpose of this description, the apparatus 10 will be described in an ice fishing application. It will be evident to one of ordinary skill in the art how the apparatus may be used in other fishing applications. After drilling a typical fishing hole in the ice, the frame 12 is set on a surface with the ice from the hole and snow packed under the frame in the hollow portion 22. Additionally, ice and snow may be packed around the frame 12 for additional support. The fishing line 28 is hooked and bated according to the user's preference and fed into the hole in the ice.

The hooking mechanism 16 is set by forcing the spring-loaded arm 40 into the upright position and positioning the retaining arm 48 over the spring-loaded arm 40 and under a catch on the trigger 44. The pivot arm 14 is positioned such that the action end 32 is directed downward and the pull line 42 and trigger line 46 are slack. The fastener 26 is tightened so that the spool 24 will not pay out fishing line 28. The set position is illustrated in FIGS. 1B and 3.

Figure 4A:
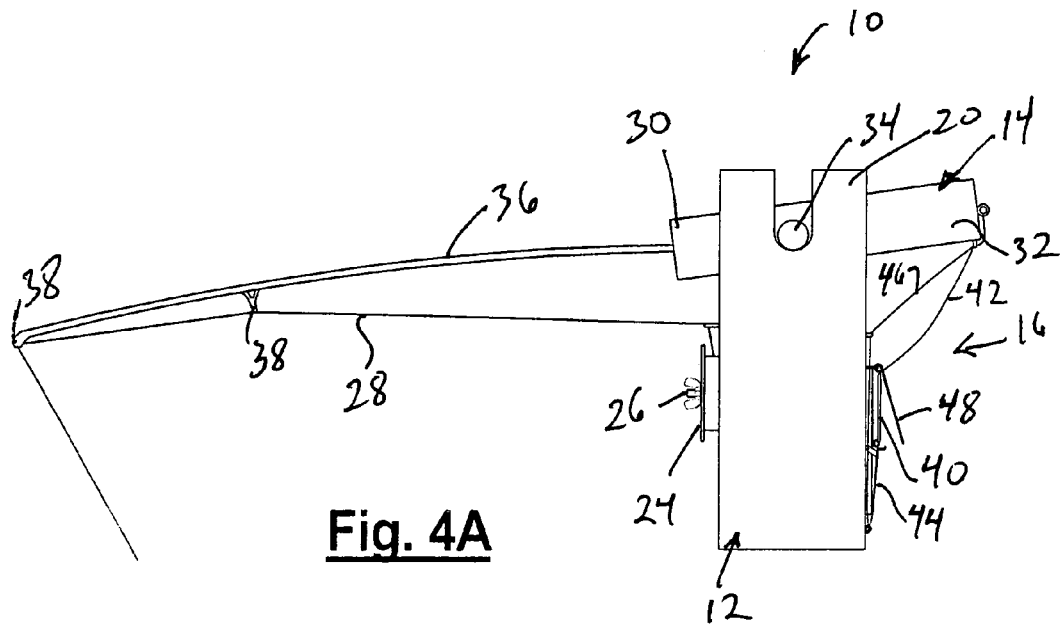
FIGS. 4A and 4B are side views of the fishing apparatus of FIG. 1 in use.
Figure 4B:
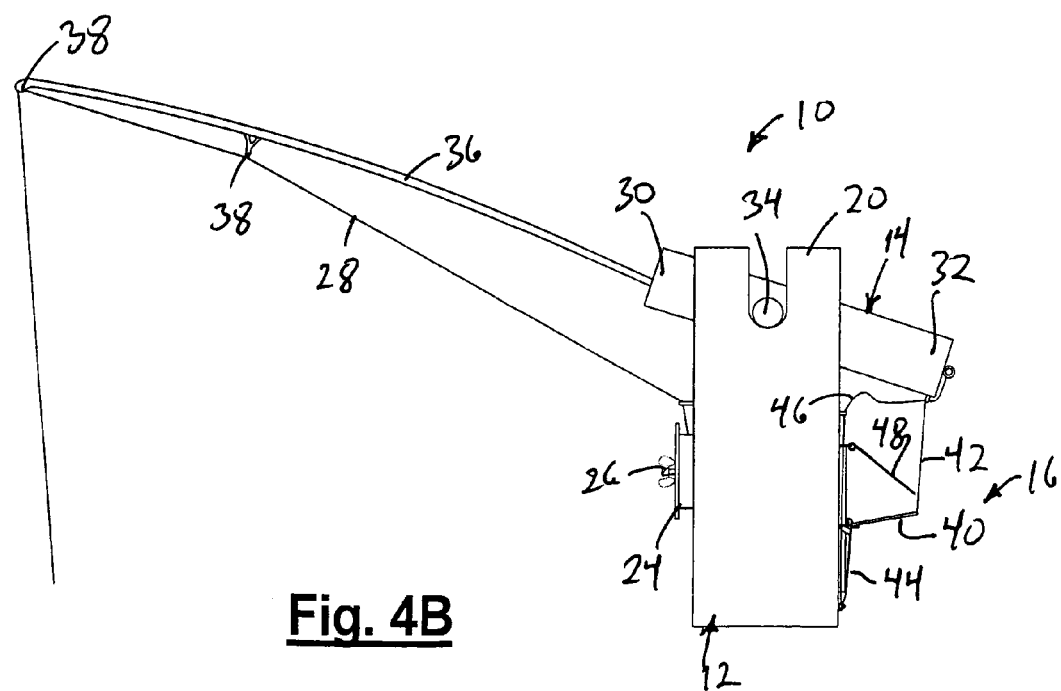

When the fishing line 28 is pulled, such as by a fish pulling on a baited hook, the flexible rod 36 will tip down, causing the pivot arm 14 to pivot such that the action end 32 is directed upward as shown in FIG. 4A. The upward action of the action end 32 puts tension on the trigger line 46, which trips the trigger 44, releasing the retaining arm 48. Without the retaining arm 48 holding the spring-loaded arm 40 against its bias, the spring-loaded arm 40 rapidly pivots downward about the spring 52 pulling on the pull line 42 as shown in FIG. 4B. The rapid pulling on the pull line 42 causes the pivot arm 14 to rapidly pivot the flexible rod 36 upward. The flexible rod 36 yanks the fishing line 28, which sets the hook in the fish's mouth. The bias of the spring-loaded arm 40 maintains tension on the fishing line 28 to prevent the fish from releasing itself from the hook without being too rigid and tearing the hook from the fish's mouth.

In an alternative embodiment the frame 12 includes flanges, spikes, or both for helping secure the frame to the ice. The flanges may be hinged and extend from the base of the frame 12 to be secured to the ice with nails or integral spikes. Alternatively, the spikes may extend from the base of the frame 12.

In a further alternative embodiment, the apparatus 10 may include a spring-loaded flag, which is released when the hooking mechanism is triggered. The flag would thus provide further indication to the user of which line has a fish when several lines are being used. Alternatively to, or in addition to, the flag, the hooking mechanism may make a noise, such as ringing a bell, to call the attention of the user.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A fishing apparatus, comprising:
 a frame;
 a pivot arm having a fulcrum that is supported by the frame, a fishing rod end, and an action end, the fulcrum being between the action end and the fishing rod end; and
 a hooking mechanism affixed to the frame, the hooking mechanism having
  a spring-loaded hooking arm and a pull line coupled between the spring-loaded hooking arm and the action end of the pivot arm; and
  a trigger and a trigger line communicating between the trigger and the action end wherein the trigger line is connected directly to the action end for triggering the spring-loaded hooking arm in response to motion of the fishing rod end.

2. The fishing apparatus of claim 1, further comprising a flexible fishing rod connected to the fishing rod end and supporting a fishing line.

3. The fishing apparatus of claim 1, the hooking mechanism further comprising a retaining arm that is operable to engage the trigger and retain the spring-loaded hooking arm against a spring bias applied to the spring-loaded hooking arm.

4. The fishing apparatus of claim 3, wherein the hooking mechanism resembles a mouse trap.

5. The fishing apparatus of claim 3, wherein the hooking mechanism resembles a mouse trap having a torsion spring.

6. The fishing apparatus of claim 1, the hooking mechanism being affixed to the frame in a vertical orientation with the spring-loaded hooking arm being biased downward such that the spring-loaded hooking arm pulls down on the pull line and the action end when the hooking mechanism is triggered.

7. The fishing apparatus of claim 1, the frame comprising a hollow base for packing a material therein to support the frame.

8. The fishing apparatus of claim 7, the material being ice chips and snow or sand.

9. A method of fishing with a fishing apparatus, comprising the steps of:
 a) providing a frame having a hollow base with an opening at one end;
 b) packing a material into the hollow base for stabilizing the frame;
 c) providing a pivot arm having a fulcrum that is supported by the frame and paying out a hook line from an end of the pivot arm; and
 d) setting a hooking mechanism having a spring-loaded hooking arm and a trigger affixed to the frame, the hooking arm being connected to an other end of the pivot arm via a pull line and the trigger being connected to the other end of the pivot arm via a trigger line which is connected directly to the other end of the pivot arm for triggering the spring-loaded hooking arm in response to motion of the end of the pivot arm.

10. The method of claim 9, wherein the pull line is connected to the other end of the pivot arm, the other end being on an opposite side of the fulcrum from the end paying out the hook line.

11. The method of claim 9, wherein the hook line is supported by a flexible fishing rod connected to the pivot arm.

12. The method of claim 9, the step of setting the hooking mechanism comprising providing a spring bias to the hooking arm, forcing the hooking arm against the spring bias, retaining the hooking arm with a retaining arm, and engaging the retaining arm to the trigger.

13. The method of claim 12, the hooking mechanism being affixed to the frame in a vertical orientation with the spring bias of the hooking arm being in the downward direction.

14. The method of claim 9, the material being ice chips and snow or sand.

* * * * *